(12) United States Patent
Ergen et al.

(10) Patent No.: US 11,323,978 B2
(45) Date of Patent: May 3, 2022

(54) METHOD AND SYSTEM FOR TRACKING POSITION OF ONE OR MORE WI-FI DEVICES

(71) Applicant: Ambeent Wireless Bilişim ve Yazilim A.Ş, Istanbul (TR)

(72) Inventors: Mustafa Ergen, Istanbul (TR); Hasan Şildir, Istanbul (TR); Sinem Çöleri Ergen, Istanbul (TR)

(73) Assignee: Ambeent Inc., Istanbul (TR)

( * ) Notice: Subject to any disclaimer, the term of this patent is extended or adjusted under 35 U.S.C. 154(b) by 0 days.

(21) Appl. No.: 15/937,822

(22) Filed: Mar. 27, 2018

(65) Prior Publication Data
US 2022/0039051 A1    Feb. 3, 2022

Related U.S. Application Data

(60) Provisional application No. 62/601,530, filed on Mar. 27, 2017.

(51) Int. Cl.
*H04W 64/00* (2009.01)
*H04W 48/04* (2009.01)
*H04W 48/20* (2009.01)
*H04W 48/16* (2009.01)
*H04W 72/00* (2009.01)

(52) U.S. Cl.
CPC ......... *H04W 64/003* (2013.01); *H04W 48/04* (2013.01); *H04W 48/16* (2013.01); *H04W 48/20* (2013.01); *H04W 72/005* (2013.01)

(58) Field of Classification Search
CPC ... H04W 64/003; H04W 48/04; H04W 48/16; H04W 48/20; H04W 72/005
See application file for complete search history.

(56) References Cited

U.S. PATENT DOCUMENTS

2015/0341881 A1* 11/2015 Hiltunen ............. H04W 72/005
370/350
2016/0021503 A1* 1/2016 Tapia ........................ G01S 5/02
455/456.1

FOREIGN PATENT DOCUMENTS

CN       104333862 A  *  2/2015
CN       107251623 A  * 10/2017  ............ H04W 64/00

* cited by examiner

*Primary Examiner* — Said M Elnoubi
(74) *Attorney, Agent, or Firm* — Farrell Patent Law PC; Mark Farrell (57) ABSTRACT

The invention provides a method and system for tracking a position of one or more Wi-Fi devices of a plurality of Wi-Fi devices. For tracking the position of the one or more Wi-Fi devices, a Triggering Router triggers the one or more Wi-Fi devices to transmit one of a broadcast probe and a directed probe through broadcasting hidden SSID networks and common SSIDs that increase a probing tendency of the one or more Wi-Fi devices. The plurality of Wi-Fi sniffers, then, collect measurement data associated with the one or more Wi-Fi devices in response to detecting the broadcast probe transmission and the directed probe transmission. Thereafter, the position of the one or more Wi-Fi devices is estimated using an adaptive machine learning model based on an indoor model whose parameters are tuned based on radio frequency (RF) measurements from the plurality of Wi-Fi devices and the measurement data.

20 Claims, 7 Drawing Sheets

METHOD AND SYSTEM FOR TRACKING POSITION OF ONE OR MORE WI-FI DEVICES

FIELD OF THE INVENTION

The invention generally relates to tracking position of one or more Wi-Fi devices. More specifically, the invention relates to tracking the position of the one or more Wi-Fi devices using indoor model parameter estimation and machine learning algorithms based on monitoring interactions of a plurality of Wi-Fi devices and a plurality of Wi-Fi access points.

BACKGROUND OF THE INVENTION

Unlicensed Radio Frequency (RF) bands contain valuable data on the interactions among Wi-Fi devices within a particular range. As a result of IEEE 802.11 specification, the data transactions require several successive opposite message deliveries to ensure a more accurate data transfer, leading to significant amount of requests filling the RF channels. Currently, most of the devices are limited to 2.4 GHz band, whose channels are occupied densely already. Unlike 2.4 GHz band, 5 GHz band contains more non-overlapping channels to provide wider bandwidth, although it suffers from high attenuation rate. From the point of monitoring RF media, 2.4 GHz frequencies are more manageable due to both limited number of channels and overlapping of bandwidth.

Tracking Wi-Fi devices is an important concern from the point of marketing, monitoring, evaluation and efficiency calculation for a wide range of business segments from retail to military applications. Currently, for RF based positioning, due to nature of Wi-Fi signals, a high sampling rate is required in order to obtain a representative signal power as a result of chaotic nature of Wi-Fi signals.

Therefore, in light of the above, there is a need for an efficient method and system that implements an adaptive and cloud integrated architecture that utilizes interactions of Wi-Fi devices and Wi-Fi access points for tracking position of Wi-Fi devices.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and system components related to tracking position of the one or more devices using indoor model parameter estimation and machine learning algorithms based on monitoring interactions of a plurality of Wi-Fi devices and a plurality of Wi-Fi access points.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Various embodiments of the invention provide a method and system for tracking position of one or more Wi-Fi devices of a plurality of Wi-Fi devices. In order to track the position of the one or more Wi-Fi devices, a Wi-Fi access point of a plurality of Wi-Fi access points acts as a Triggering Router to broadcast hidden and popular service set identifier (SSID) networks and common SSIDs to increase a probing tendency of the one or more Wi-Fi devices. In some embodiments, a Wi-Fi sniffer of a plurality of sniffers acts as the Triggering Router. Thus, the Triggering Router triggers the one or more Wi-Fi devices to transmit one of a broadcast probe and a directed probe, which is detected by the plurality of Wi-Fi sniffers. The plurality of Wi-Fi sniffers, then, collect measurement data associated with the one or more Wi-Fi devices in response to the broadcast probe transmission and the directed probe transmission from the one or more Wi-Fi devices. Further, one or more parameters corresponding to an indoor model are tuned based on radio frequency (RF) measurements from the plurality of Wi-Fi devices. Thereafter, the position of the one or more Wi-Fi devices is estimated using an adaptive machine learning model based on the tuned indoor model and the measurement data.

Figure 1:
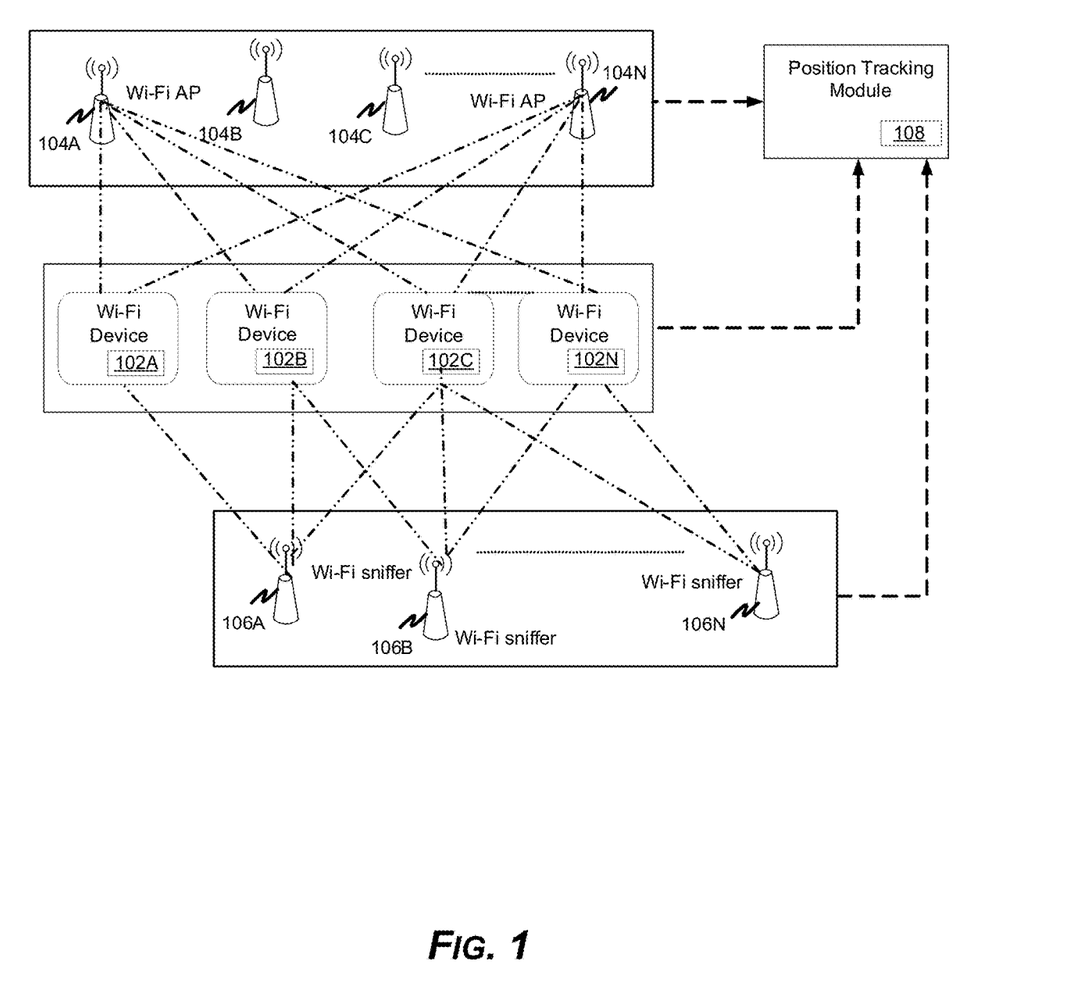
FIG. 1 illustrates a system for tracking position of one or more Wi-Fi devices of a plurality of Wi-Fi devices in accordance with an embodiment of the invention.

FIG. 1 illustrates a system 100 for tracking position of one or more Wi-Fi devices of a plurality of Wi-Fi devices 102A-102N in accordance with an embodiment of the invention.

As illustrated in FIG. 1, plurality of Wi-Fi devices 102A-102N interact with plurality of Wi-Fi access points 104A-104N. Plurality of Wi-Fi devices 102A-102N are user devices such as, but not limited to, a mobile device, a personal digital assistant, a computer, a laptop, a smart phone and a tablet. Plurality of Wi-Fi access points 104A-104N are deployed in places such as, but not limited to, homes, enterprises and public spaces.

In order to track a position of Wi-Fi device 102A, Wi-Fi access point 104A acts as a Triggering Router to broadcast several networks to increase a probing tendency of Wi-Fi device 102A. In an embodiment, a Wi-Fi sniffer 106A of a plurality of Wi-Fi sniffers 106A-106N acts as the Triggering Router. The Triggering Router triggers Wi-Fi device 102A to transmit one of a broadcast probe and a directed probe through broadcasting hidden and popular service set identifier (SSID) networks and common SSIDs.

The measurement data associated with Wi-Fi device 102A is then detected by plurality of Wi-Fi sniffers 106A-106N in response to transmission of one of the broadcast probe and the directed probe from Wi-Fi device 102A. The measurement data comprises Received Signal Strength Indicator (RSSI) signals associated with plurality of Wi-Fi devices 102A-102N.

For detecting the measurement data associated with Wi-Fi device 102A, plurality of Wi-Fi sniffers 106A-106N are operated using a synchronization algorithm that enables plurality of Wi-Fi sniffers 106A-106N to switch to and sniff the same channels simultaneously.

Further, a listening duration of plurality of Wi-Fi sniffers 106A-106N is adjusted based on a number of Wi-Fi devices and a probing frequency of Wi-Fi device 102A.

The probability of capturing signals by plurality of Wi-Fi sniffers 106A-106N is exposed to many unknown driving mechanisms that include chaotic nature of Wi-Fi signals. In order to increase the probability of capturing transmissions, plurality of Wi-Fi sniffers 106A-106N are tuned to sniff the same channels in addition to the transmission channel of the Triggering Router. Since RSSI signals are omnidirectional and noisy, only signals that are captured by several Wi-Fi sniffers carry significant information for the positioning.

If plurality of Wi-Fi sniffers 106A-106N are limited to scanning of 2.4 GHz channels only, initially, plurality of Wi-Fi sniffers 106A-106N spend equal time on each channel. Once the number of Wi-Fi devices is detected on a particular channel, it is used as a weighting coefficient in order to determine the next monitoring time for the corresponding channel.

The measurement data is then collected by a position tracking module 108 for accurately estimating the position of Wi-Fi device 102A. Position tracking module 108 may be implemented in an adaptive cloud based integrated architecture that utilizes interactions of plurality of Wi-Fi devices 102A-102N and plurality of Wi-Fi access points 104A-104n to calculate the position of Wi-Fi device 102A. Position tracking module 108 is further explained in detail in conjunction with FIG. 2.

Figure 2:
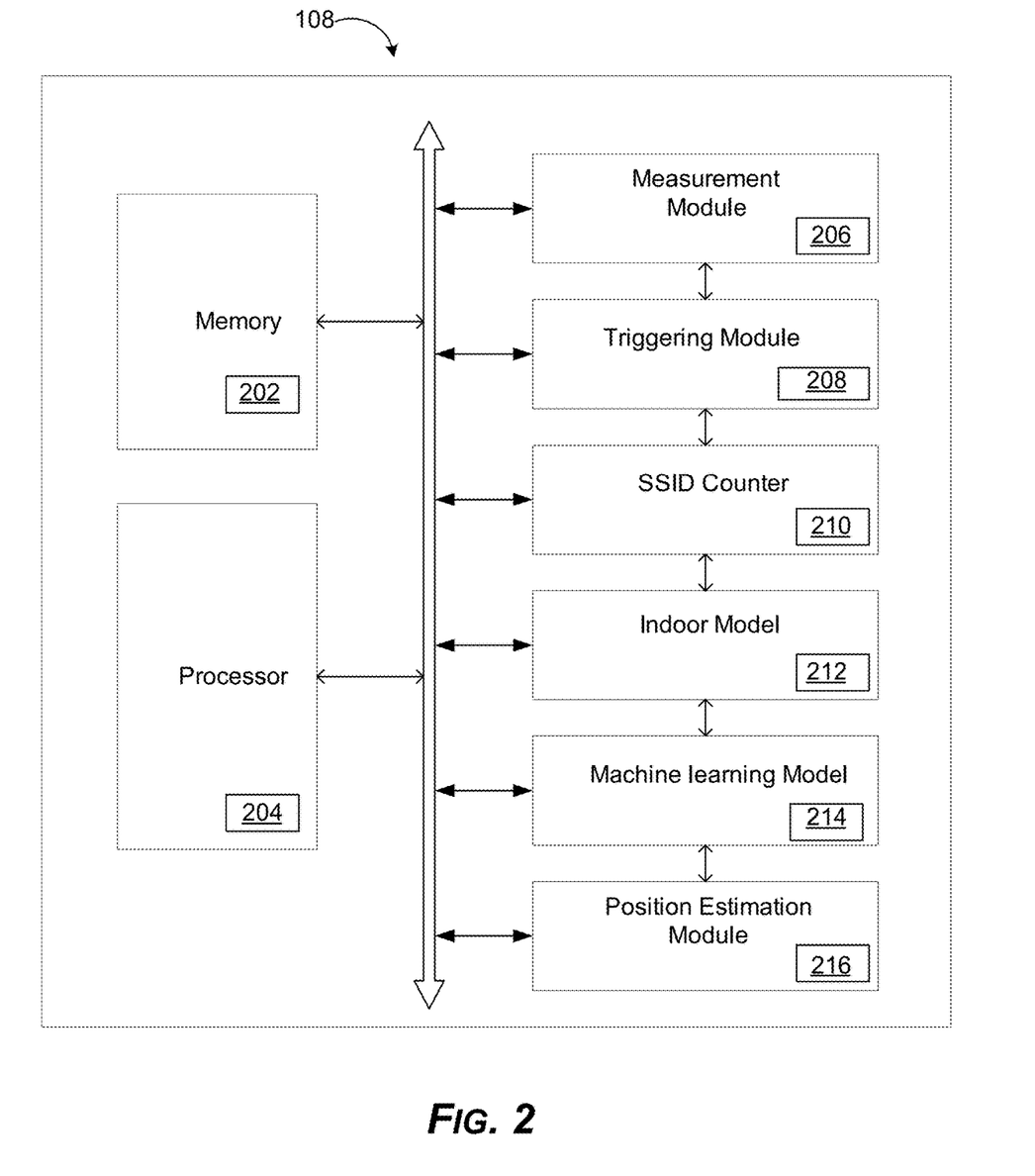
FIG. 2 illustrates a position tracking module for tracking position of one or more Wi-Fi devices of a plurality of Wi-Fi devices in accordance with an embodiment of the invention.

FIG. 2 illustrates position tracking module 108 for tracking the position of Wi-Fi device 102A in accordance with an embodiment of the invention.

As illustrated in FIG. 2, position tracking module 108 includes a memory 202 and a processor 204 communicatively coupled to memory 202. Memory 202 and processor 204 are communicatively coupled to various other modules of position tracking module 108.

Position tracking module 108 utilizes interactions of plurality of Wi-Fi devices 102A-102N and plurality of Wi-Fi access points 106A-106N for tracking the position of Wi-Fi device 102A. Position tracking module 108 includes a measurement module 206 that monitors the interactions and measurement data pertaining to the interactions are collected and stored in measurement module 206.

In order to efficiently monitor and collect the measurement data, position tracking module 108 includes a triggering module 208 that enables Wi-Fi access point 104A to act as the Triggering Router to broadcast several networks to increase a probing tendency of Wi-Fi device 102A. In an embodiment, Wi-Fi sniffer 106A acts as the Triggering Router. In order to increase the probing tendency, the Triggering Router broadcasts hidden and popular SSID networks and common SSIDs, thus triggering a broadcast probe transmission and a directed probe transmission from Wi-Fi device 102A. The broadcast probes and the directed probes from Wi-Fi device 102A are monitored for some amount of time to construct a database. The process of triggering is further explained in detail as follows.

The association process of plurality of Wi-Fi devices 102A-102N and plurality of Wi-Fi access points 104A-104N is defined by IEEE 802.11 and includes several opposite signals. One or more Wi-Fi access points of plurality of access points 104A-104N broadcast a beacon signal (typically 0.1 second frequency) to let surrounding Wi-Fi devices know of the network properties of the one or more Wi-Fi access points in addition to existence of the one or more Wi-Fi access points from a pre-chosen transmission channel.

In order to search for a network, Wi-Fi device 102A employs either a passive scanning mode or an active scanning mode. In the passive scanning mode, Wi-Fi device 102A switches channels in a predefined sequence and listens to beacons from the one or more Wi-Fi access points for a particular amount of time in order to report available Wi-Fi access points and signal qualities to a user. However, in passive scanning mode, the detection of Wi-Fi device 102A is not possible since Wi-Fi device 102A does not transmit any signal. Also, passive scanning of all channels take significant amount of time and therefore Wi-Fi device 102A is usually in active scanning mode. In the active scanning mode, Wi-Fi device 102A sends probe requests to surrounding Wi-Fi access points. In response to the probe requests, the Wi-Fi access points broadcast a probe response that includes information similar to beacons.

The probe requests from Wi-Fi device 102A are of two types. A broadcast probe triggers all of the surrounding Wi-Fi access points for the probe response. On the other hand, a directed probe triggers only a particular SSID network related Wi-Fi access point, revealing the SSID which Wi-Fi device 102A is searching for.

Since the signal transmission frequency of Wi-Fi device 102A is high for battery management policies, positioning and signal capture becomes harder. Thus, the Triggering Router improves positioning and signal capture of Wi-Fi device 102A by broadcasting two types of networks.

The Triggering Router broadcasts a hidden SSID network. In this case, the Triggering Router does not necessarily have a digital subscriber line (DSL) connection. Once Wi-Fi device 102A receives a beacon with a NULL SSID value, Wi-Fi device 102A transmits a directed probe request to a corresponding Wi-Fi access point of plurality of Wi-Fi access points 104A-104N which in turn delivers all information related to it. Eventually, Wi-Fi device 102A receives all the information needed with respect to the Wi-Fi access point. The hidden networks are broadcast through at least three non-overlapping channels in order to cover most of the Wi-Fi devices in 2.4 GHz frequencies.

Once Wi-Fi device 102A sends the directed probe request to the Wi-Fi access point, the Wi-Fi access point transmits a probe response message to Wi-Fi device 102A. The probe response message indicates availability and signal strength of the Wi-Fi access points along with other parameters. On receiving the probe response message, Wi-Fi device 102A, transmits an authentication request to the Wi-Fi access point. The Wi-Fi access point then transmits an authentication response which indicates authentication success or failure of Wi-Fi device 102A. If the authentication was successful, Wi-Fi device 102A transmits an association request to the Wi-Fi access point and on receiving the association request, the Wi-Fi access point transmits an association response to Wi-Fi device 102A, granting or denying access to the Wi-Fi access point.

Further, the Triggering Router broadcasts most common SSIDs that are obtained from directed probe requests from plurality of Wi-Fi devices 102A-102N that are around. Position tracking module 108 includes an SSID counter 210 in a cloud database that counts the most common SSIDs to determine the router SSIDs. Once a familiar SSID is around Wi-Fi device 102A, it increases the probability of directed probe transmission from Wi-Fi device 102A in order to evaluate the quality of the network.

Thereafter, measurement module 206 collects measurement data associated with Wi-Fi device 102A from plurality of Wi-Fi sniffers 106A-106N, in response to one of the broadcast probe transmission and the directed probe transmission from Wi-Fi device 102A.

Moving on, position tracking module 108 includes an indoor model 212. The parameters of indoor model 212 are tuned or updated based on radio frequency (RF) measurements from plurality of Wi-Fi devices 102A-102N.

Position tracking module 108 further includes an adaptive machine learning model 214. Adaptive machine learning model 214 is trained using data obtained through a solution of indoor model 212 based on one or more parameters and the measurement data collected by plurality of Wi-Fi sniffers 106A-106N that is stored in measurement module 206.

Further, adaptive machine learning model 214 is updated based on checking a pre-training range associated with RSSI measurements from plurality of Wi-Fi devices 102A-102N and a plurality of parameters associated with indoor model 214.

Finally, the position of Wi-Fi device 102A is estimated by a position estimation module 216 included in position tracking module 108 using adaptive machine learning model 214 that was trained using the tuned indoor model 212 and the measurement data.

In accordance with an exemplary embodiment, the estimation of the position of Wi-Fi device 102A using position tracking module 108 is further explained in detail as follows.

The implementation of theoretical path loss models suffers from inherent capability of handling reflections, scattering and absorption effects. The path loss model for this case is given by:

$$PL(d) - \beta = 10\alpha \log\left(\frac{d}{d_0}\right) \tag{1}$$

where $PL(d)$ is the path loss at distance d, $d_0$ is the reference distance, $\alpha$ and $\beta$ are parameters to be updated from real-time measurements. Mathematically, $\alpha$ represents the path loss exponent and $\beta$ is the path loss at reference distance.

In accordance with an embodiment, the parameters of indoor model 212 are updated, once a trusted set of measurements becomes available. The signals collected from plurality of Wi-Fi devices 102A-102N are used to calibrate indoor model 212, since the positions of the transmitters and the receivers corresponding to plurality of Wi-Fi devices 102A-102N are known in addition to the transmit powers. Plurality of Wi-Fi sniffers 106A-106N also transmit data while uploading measurements to the host network through wireless connections and have the potential to broadcast beacons if needed. All the signals in the wireless medium are captured by plurality of Wi-Fi sniffers 106A-106N because of the synchronization between them. Any Wi-Fi device whose position and transmit power are known is used in the formulation to update the path loss model parameters as follows:

$$\min_{\alpha_k, \beta_k} \sum_{i=1}^{N} \sum_{\substack{j=1 \\ j \neq i}}^{N} \left(\hat{PL}_{k,j,i}(d) - \beta_k - 10\alpha_k \log\left(\frac{d_{ij}}{d_0}\right)\right)^2 \tag{2}$$

$$\text{s.t.}$$
$$\alpha_L \leq \alpha_k \leq \alpha_U$$
$$\beta_L \leq \beta_k \leq \beta_U$$

where $d_{ij}$ is the distance between $i^{th}$ and $j^{th}$ Wi-Fi sniffers, $\alpha_k$ and $\beta_k$ are the estimated parameters at time sample k, $\alpha_L$ and $\alpha_U$ are the lower and upper bounds of $\alpha$, $\beta_L$ and $\beta_U$ are the lower and upper bounds of $\beta$, $\hat{PL}_{k,j,i}(d)$ is the estimated path loss from $i^{th}$ transmitter to $j^{th}$ receiver at time sample k, N is the number of Wi-Fi devices. For a more robust estimation, historical measurements are included in the calculation of $\hat{PL}_{k,j,i}(d)$ as follows:

$$\hat{PL}_{k,j,i}(d) = f(PL_{k,j,i}(d), PL_{k-1,j,i}(d), K, PL_{k-T,j,i}(d)) \tag{3}$$

where $PL_{k,j,i}(d)$ is the path loss measurement at time k, T is the time horizon and f is the mathematical expression for filtering.

Equation 1 is accurate when the parameters are recursively updated from Equation 2 once the transmit power of a particular Wi-Fi device is known. In practice, transmission results in significant amount of battery loss and thus the transmission power is highly dependent on the mode, brand and settings of a Wi-Fi device which is not possible to track based on the probe signals solely and therefore a transmission signal is captured by all Wi-Fi sniffers of plurality of Wi-Fi sniffers 106A-106N. The received power signals deliver the following ratio:

$$\frac{P_{r,i}}{P_{r,j}} = \frac{d_{STA-SN_j}^{\alpha}}{d_{STA-SN_i}^{\alpha}} \tag{4}$$

where $P_{r,j}$ is the RSSI of the Wi-Fi device by $i^{th}$ transmitter, $d_{STA-SN_i}$ is the distance between Wi-Fi device 102A and a Wi-Fi sniffer, which is calculated from:

$$d_{STA-SNi} = \sqrt{(x_{STA}-SN_{i,x})^2 + (y_{STA}-SN_{i,y})^2} \quad (5)$$

where $SN_{i,x}$ and $SN_{i,y}$ are x and y coordinates respectively of $i^{th}$ Wi-Fi sniffer, $x_{STA}$ and $y_{STA}$ are x and y coordinates respectively of Wi-Fi device 102A.

Based on Equation 4 and Equation 5, the following optimization problem is defined to determine the position of Wi-Fi device 102A with the goal of minimizing the linear combination path loss model expression residuals:

$$\min_{x_{STA}, y_{STA}} \sum_{i=1}^{N} \sum_{j<i}^{N} (P_{r,j}(d_{STA-SN_j})^\alpha - P_{r,i}(d_{STA-SN_i})^\alpha)^2 \quad (6)$$

The solution of Equation 2 is recursively repeated in order to increase the accuracy of the positioning and the computational load is negligible. On the other hand, Equation 6 is solved for each Wi-Fi device, resulting in computational overload when the number of Wi-Fi devices is high.

Therefore, in order to reduce the computation load, machine learning algorithms are implemented in adaptive machine learning model 214 and are trained from particular solution of Equation 6. The model parameters and the RSSI ranges are known both theoretically and experimentally from the measurements. Thus, Equation 6 is solved for particular combinations of the model parameters and the RSSI ranges in order to train adaptive machine learning model 214.

The machine learning algorithms used in adaptive machine learning model 214 include numerical regression equations that deliver more accurate results when prediction data belong to the subset of training. Thus, a pre-trained data check layer is also included, in order to ensure that the training dataset includes the current measurements and estimated parameters. When the current measurements and estimated parameters do not belong to the enclosed high dimensional space of training samples, the machine learning process is repeated to extend its training data based on the new measurements, which is managed through performing the action at less CPU demanding time intervals.

Thereafter, adaptive machine learning model 214 delivers its input to position estimation module 216 which estimates the position of Wi-Fi device 102A based on the RSSI measurements and the current parameters, eliminating the recursive solution of Equation 6.

Plurality of Wi-Fi sniffers 106A-106N contribute to localization of signals collected for determining the position of Wi-Fi device 102A in position tracking module 108, in conjunction with indoor model 212 and adaptive machine learning model 214.

Various implementation architectures of plurality of Wi-Fi sniffers 106A-106N are further explained in detail as follows.

Figure 3:
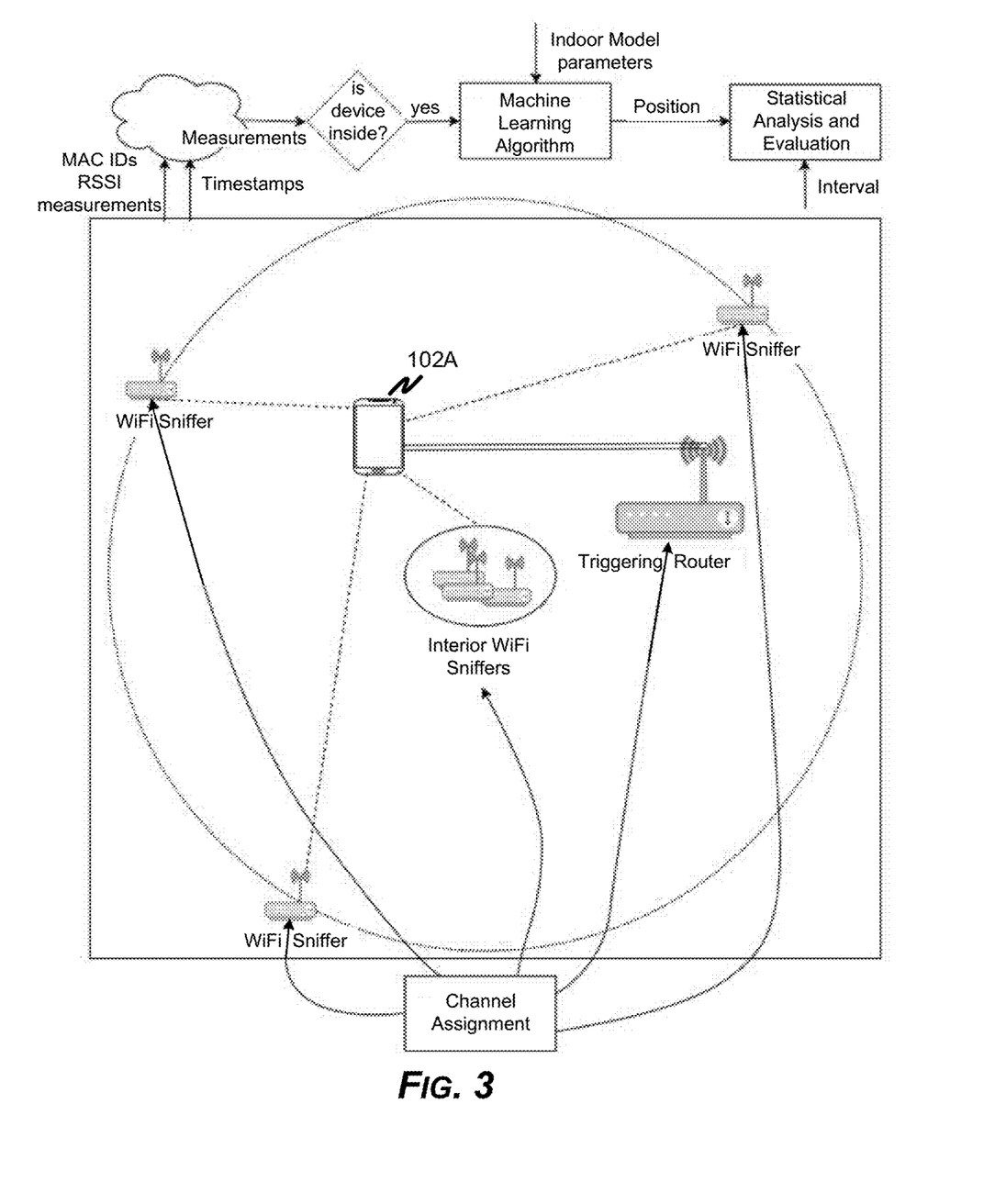
FIG. 3 illustrates a Wi-Fi sniffer architecture for determining position of one or more Wi-Fi devices when the transmit power of the one or more Wi-Fi devices is known in accordance with an embodiment of the invention.

FIG. 3 illustrates a Wi-Fi sniffer architecture for determining position of Wi-Fi device 102A when the transmit power of Wi-Fi device 102A is known in accordance with an embodiment of the invention.

As illustrated in FIG. 3, at least six Wi-Fi sniffers are necessary to track Wi-Fi device 102A and this architecture is used if the transmission power of Wi-Fi device 102A is known. This Wi-Fi sniffer architecture depends on a number of Wi-Fi sniffers, the accuracy issues and some local objectives.

Since a primary consideration in tracking Wi-Fi device 102A is the determination of the existence of Wi-Fi device 102A, three Wi-Fi sniffers are implemented in the center of the circle which approximately is the room area, in order to capture the signals from Wi-Fi device 102A as illustrated in FIG. 3. Average RSSI from the receivers is a better indication of the distance of Wi-Fi device 102A from the Wi-Fi sniffers using the already updated path loss model. Thus, a more accurate distance that determines whether Wi-Fi device 102A is inside or not, can be calculated robustly.

Next, exterior Wi-Fi sniffers are used to determine the position of Wi-Fi device 102A given that Wi-Fi device 102A is determined to be inside, through machine learning algorithms.

Figure 4:
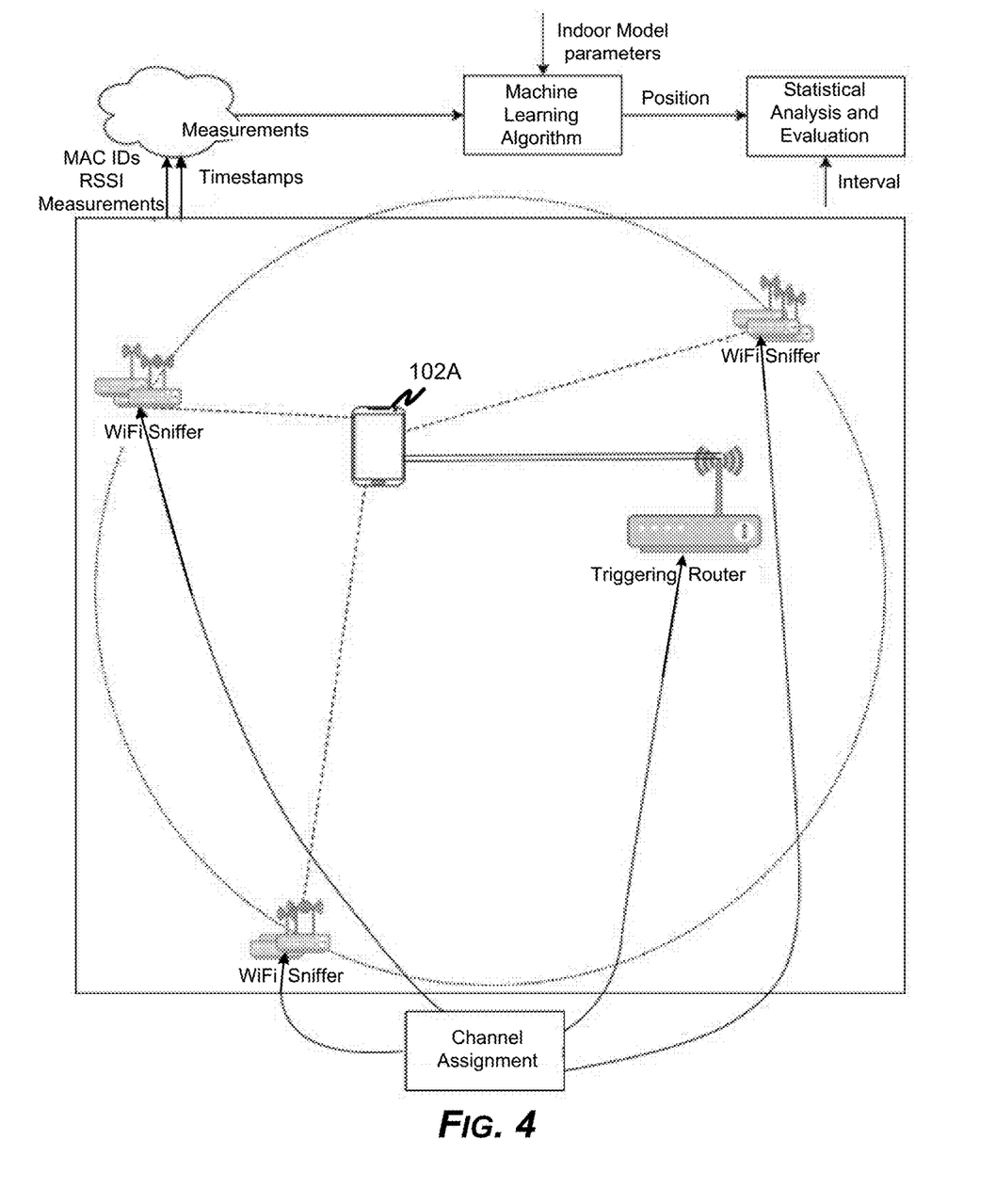
FIG. 4 illustrates a Wi-Fi sniffer architecture with noise filtering for determining position of one or more Wi-Fi devices when the transmit power of the one or more Wi-Fi devices is not known in accordance with an embodiment of the invention.

FIG. 4 illustrates a Wi-Fi sniffer architecture with noise filtering for determining position of Wi-Fi device 102A when the transmit power of Wi-Fi device 102A is not known in accordance with an embodiment of the invention.

As illustrated in FIG. 4, the Wi-Fi sniffer architecture implements Wi-Fi sniffers in three groups. The Wi-Fi signal RSSI values are noisy due to the inherent nature of the waves, reflections, absorptions and other unknown sources. At least nine Wi-Fi sniffers, leading to three groups, are implemented to ensure statistically accurate information. This implementation does not explicitly include an "Inside/Outside" checker for Wi-Fi device 102A, however the resulting position of Wi-Fi device 102A provides higher accuracy.

Figure 5:
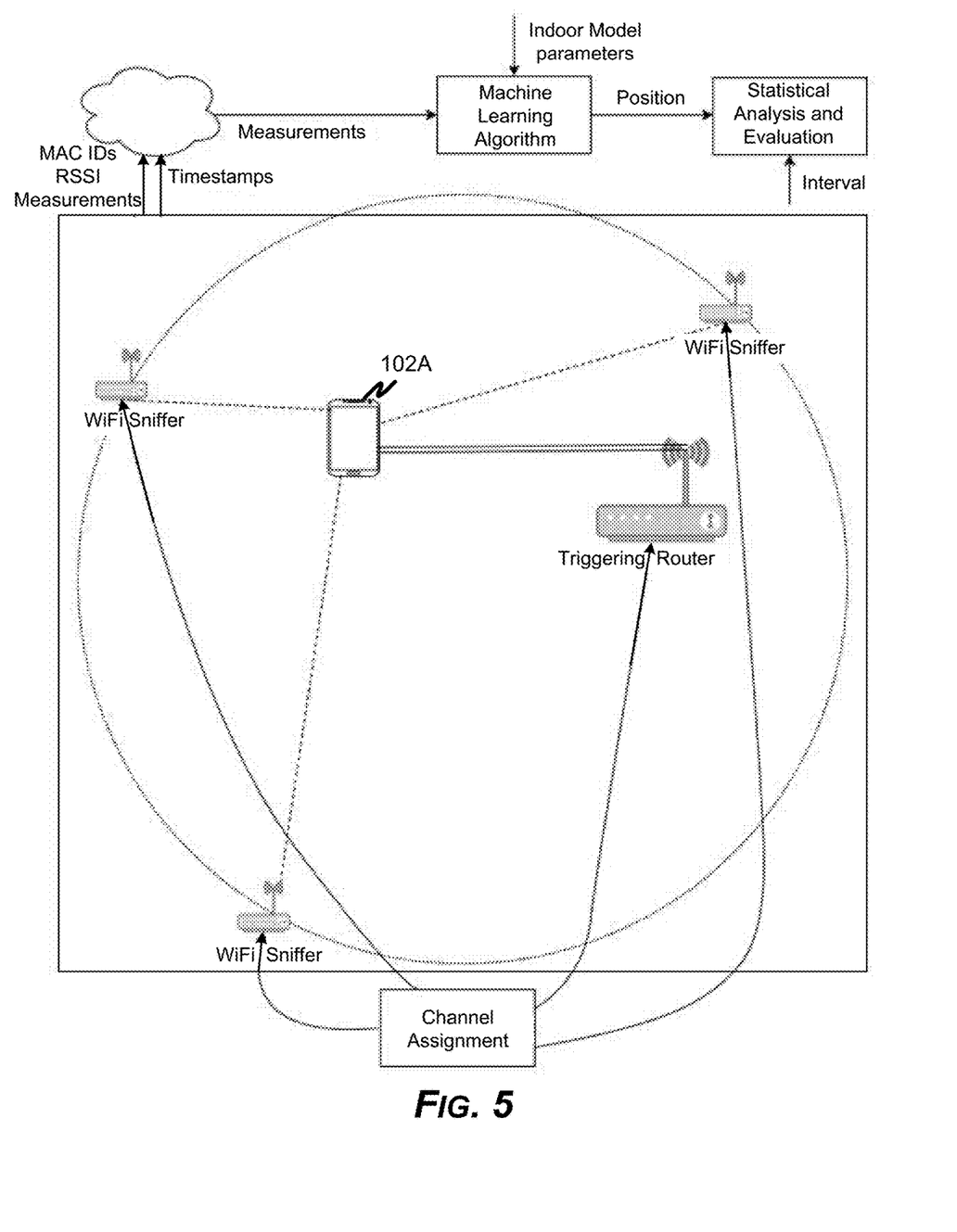
FIG. 5 illustrates a Wi-Fi sniffer architecture for determining position of one or more Wi-Fi devices when the transmit power of the one or more Wi-Fi devices is not known in accordance with an embodiment of the invention.

FIG. 5 illustrates a Wi-Fi sniffer architecture for determining position of Wi-Fi device 102A when the transmit power of Wi-Fi device 102A is not known in accordance with an embodiment of the invention.

As illustrated in FIG. 5, the Wi-Fi sniffer architecture implements only three Wi-Fi sniffers. An advantage of this implementation is the cost effective performance, however, the noisy nature of the signals requires filtering from several successive measurements for more accurate positioning of Wi-Fi device 102A.

Figure 6:
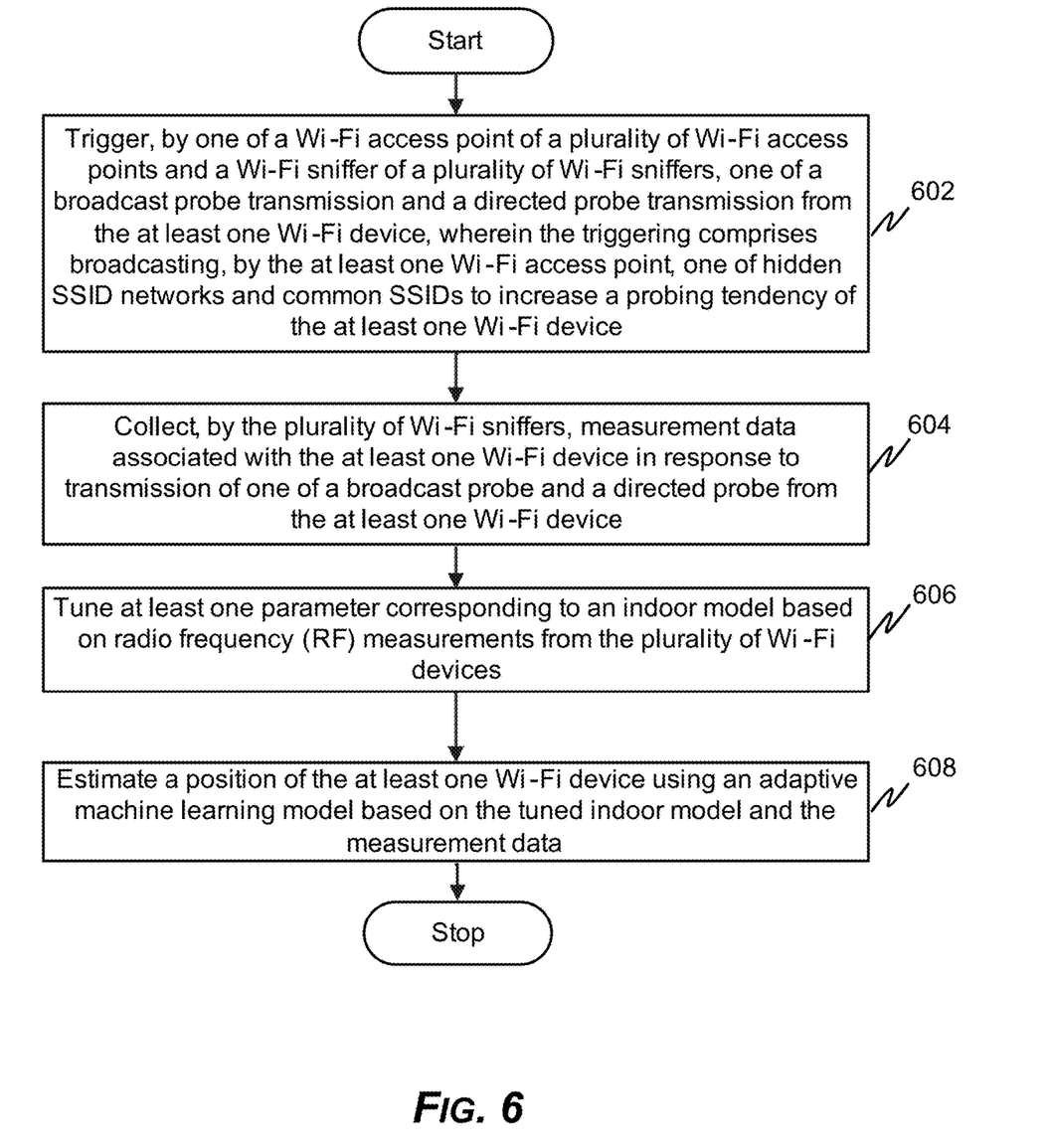
FIG. 6 illustrates a flowchart of a method for tracking a position of one or more Wi-Fi devices of a plurality of Wi-Fi devices in accordance with an embodiment of the invention.

FIG. 6 illustrates a flowchart of a method for tracking the position of Wi-Fi device 102A in accordance with an embodiment of the invention.

At step 602, triggering module 208 causes Wi-Fi access point 104A to act as a Triggering Router to trigger one of a broadcast probe transmission and a directed probe transmission from Wi-Fi device 102A by broadcasting hidden SSID networks and common SSIDs to increase a probing tendency of Wi-Fi device 102A. In an embodiment, Wi-Fi sniffer 106A acts as the Triggering Router.

The Triggering Router broadcasts hidden and popular SSID networks and on receiving a beacon with a NULL SSID value, Wi-Fi device 102A, transmits a probe request message to one or more Wi-Fi access points of plurality of Wi-Fi access points 104A-104N. Step 602 is further described in detail in conjunction with FIG. 7.

Subsequently, at step 604, measurement data associated with Wi-Fi device 102A is collected by plurality of Wi-Fi sniffers 106A-106N in response to the transmission of one of the broadcast probe and the directed probe from Wi-Fi device 102A and is stored in measurement module 206. The measurement data includes RSSI signal measurements from Wi-Fi device 102A.

For detecting the measurement data associated with Wi-Fi device 102A, plurality of Wi-Fi sniffers 106A-106N are operated using a synchronization algorithm that enables plurality of Wi-Fi sniffers 106A-106N to switch to and sniff the same channels simultaneously.

Further, a listening duration of plurality of Wi-Fi sniffers 106A-106N is adjusted based on a number of Wi-Fi devices and a probing frequency of Wi-Fi device 102A.

Subsequently, at step 606, parameters of indoor model 212 are tuned based on RF measurements from plurality of Wi-Fi devices 102A-102N.

Thereafter, at step 608, the position of Wi-Fi device 102A is estimated in position estimation module 216 using adaptive machine learning model 214 that is based on the tuned indoor model 212 and the measurement data from measurement module 206.

The machine learning algorithm of adaptive machine learning model 214 is derived from indoor model 212 whose parameters are estimated from RF measurements from plurality of Wi-Fi devices 102A-102N, in order to track the changes in the environment over time.

Adaptive machine learning model 214 is trained using data obtained through a solution of indoor model 212 based on one or more parameters and the measurement data collected by plurality of Wi-Fi sniffers 106A-106N that is stored in measurement module 206.

Further, adaptive machine learning model 214 is updated based on checking a pre-training range associated with RSSI measurements from plurality of Wi-Fi devices 102A-102N and a plurality of parameters associated with indoor model 214.

Finally, the position of Wi-Fi device 102A is estimated in position estimation module 216 using adaptive machine learning model 214 that was trained using the tuned indoor model 212 and the measurement data.

Figure 7:
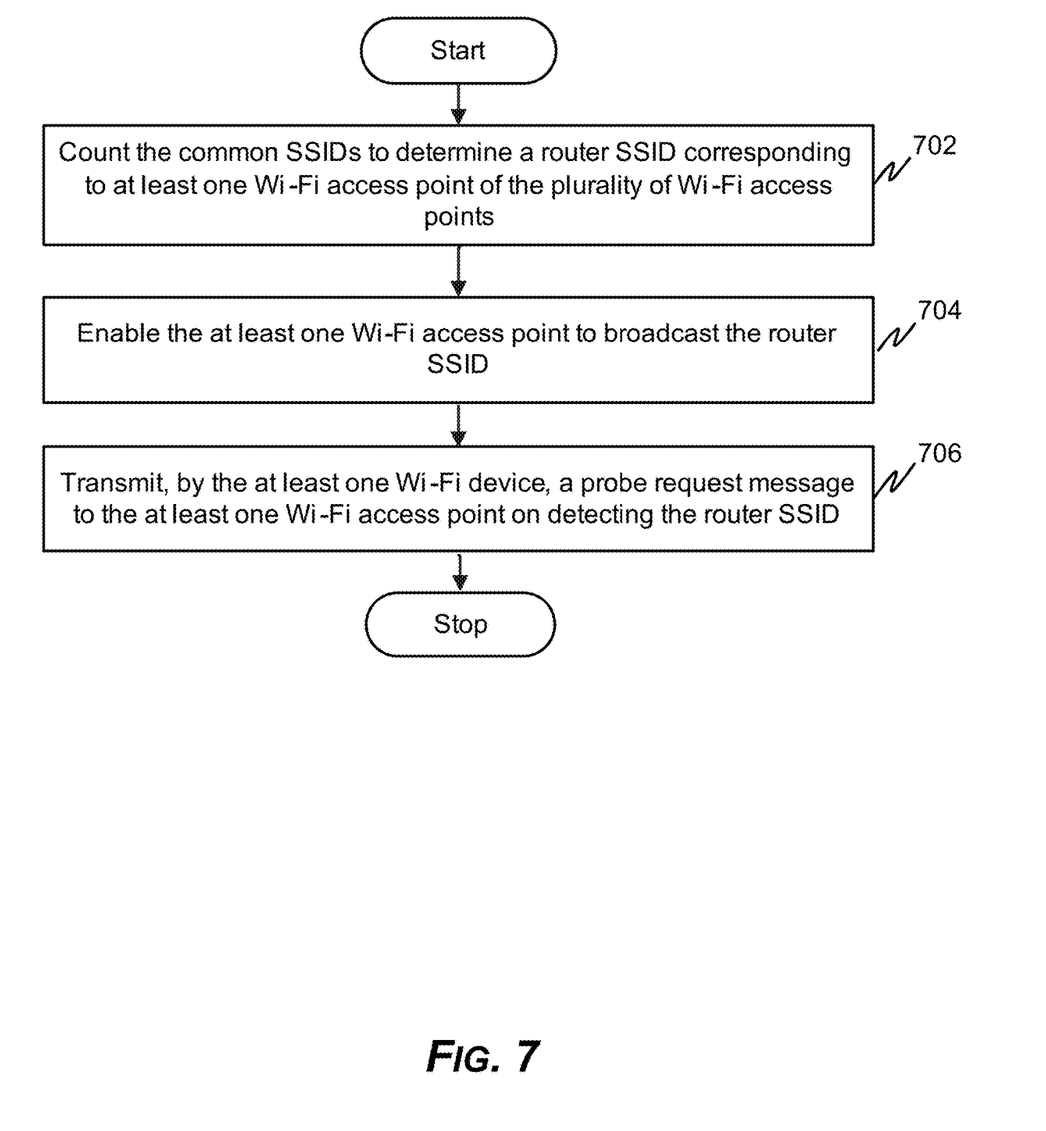
FIG. 7 illustrates a flowchart of a method for triggering, by a Wi-Fi access point, a Wi-Fi device to transmit one of a broadcast probe and a directed probe in accordance with an embodiment of the invention.

FIG. 7 illustrates a flowchart of a method for triggering, by the Triggering Router, Wi-Fi device 102A to transmit one of a broadcast probe and a directed probe in accordance with an embodiment of the invention.

At step 702, SSID counter 210 counts the most common SSIDs to determine a router SSID corresponding to one or more Wi-Fi access points of plurality of Wi-Fi access points 104A-104N.

Subsequently, at step 704, the one or more Wi-Fi access points broadcast the router SSID.

On detecting the router SSID, at step 706, Wi-Fi device 102A transmits a probe request message to the one or more Wi-Fi access points.

The invention provides a mechanism for efficiently and accurately estimating position of Wi-Fi devices, which includes the position and the identity for indoor applications.

Further, the invention provides an architecture that contains a synchronization scheme for several Wi-Fi sniffers to implement an adaptive channel listening policy based on current measurements, network conditions and limits of data processing. Once the Wi-Fi sniffers obtain information on the Wi-Fi devices, a cloud based database and a computation algorithm delivers the position of a corresponding Wi-Fi device through evaluation of a pre-defined machine learning algorithm.

The computational load of the machine learning algorithm for the calculation of Wi-Fi device positions is significantly reduced, dealing with computational complexity when there are many Wi-Fi device measurements. The machine learning algorithm is trained using the data obtained through solution of an adaptive indoor model at various parameter and measurement values. The parameters of the indoor model are tuned based on the RF measurements. Pre-defined Wi-Fi device signals are considered as a reference in the update of the parameters of the indoor model. Thus, if there is a stationary obstacle within the zone, more accurate positioning of a Wi-Fi device becomes feasible.

Further, the invention implements a router in addition to the routers with DSL connection that is synchronized with the Wi-Fi sniffers, to broadcast several networks to increase the probing tendency of visiting Wi-Fi devices. The probing tendency is mainly increased through broadcasting hidden and popular SSID networks, which are obtained through monitoring directed probes of Wi-Fi devices for some amount of time to construct the database.

Thus, the invention provides an efficient technique to monitor RF environment in order to track Wi-Fi devices, increasing the probability of capturing the Wi-Fi devices and considering real time computational considerations in addition to disturbances in the RF environment.

Those skilled in the art will realize that the above recognized advantages and other advantages described herein are merely exemplary and are not meant to be a complete rendering of all of the advantages of the various embodiments of the invention.

The system, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention. The computing device includes a processor, a memory, a nonvolatile data storage, a display, and a user interface.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for tracking a position of at least one Wi-Fi device of a plurality of Wi-Fi devices, the method comprising:

triggering, by a Wi-Fi access point of a plurality of Wi-Fi access points and a Wi-Fi sniffer of a plurality of Wi-Fi sniffers, one of a broadcast probe transmission or a directed probe transmission from the at least one Wi-Fi device, wherein the triggering comprises broadcasting, by the at least one Wi-Fi access point, one of hidden service set identifiers (SSIDs) or common SSIDs to increase a probing tendency of the at least one Wi-Fi device;

collecting, by the plurality of Wi-Fi sniffers, measurement data associated with the at least one Wi-Fi device in response to transmission of the broadcast probe or the directed probe from the at least one Wi-Fi device, wherein the plurality of Wi-Fi sniffers use a synchronization algorithm to switch to and sniff same channels simultaneously;

tuning, by one or more processors, at least one parameter corresponding to an indoor model based on radio frequency (RF) measurements from the plurality of Wi-Fi devices; and estimating, by the one or more processors, a position of the at least one Wi-Fi device using an adaptive machine learning model based on the tuned indoor model and the measurement data.

2. The method according to claim 1, wherein the triggering further comprises:
on receiving a beacon with a NULL SSID value, transmitting, by the at least one Wi-Fi device, a probe request message to at least one Wi-Fi access point of the plurality of Wi-Fi access points.

3. The method according to claim 1, wherein the triggering further comprises:
counting, by the one or more processors, the common SSIDs to determine a router SSID corresponding to at least one Wi-Fi access point of the plurality of Wi-Fi access points;
enabling, by the one or more processors, the at least one Wi-Fi access point to broadcast the router SSID; and
on detecting the router SSID, transmitting, by the at least one Wi-Fi device, a probe request message to the at least one Wi-Fi access point.

4. The method according to claim 1, wherein the collecting comprises, adjusting, by the one or more processors, a listening duration of the plurality of Wi-Fi sniffers based on a number of the Wi-Fi devices and a probing frequency corresponding to one of the Wi-Fi devices of the plurality of W-Fi devices.

5. The method according to claim 1, wherein the measurement data comprise Received Signal Strength Indicator (RSSI) signals associated with the plurality of Wi-Fi devices.

6. The method according to claim 1, further comprising training the adaptive machine learning model using data obtained through a solution of the indoor model based on the at least one parameter and the measurement data collected by the plurality of Wi-Fi sniffers.

7. The method according to claim 1, further comprising updating the adaptive machine learning model based on checking a pre-training range associated with RSSI measurements from the plurality of Wi-Fi devices and a plurality of parameters associated with the indoor model.

8. A system for tracking a position of at least one Wi-Fi device of a plurality of Wi-Fi devices, the system comprising:
a memory;
a processor communicatively coupled to the memory, wherein the processor is configured to:
trigger, by a Wi-Fi access point of a plurality of Wi-Fi access points and a Wi-Fi sniffer of a plurality of Wi-Fi sniffers, one of a broadcast probe transmission or a directed probe transmission from the at least one Wi-Fi device, wherein the triggering comprises broadcasting, by the at least one Wi-Fi access point, one of hidden SSIDs and common SSIDs to increase a probing tendency of the at least one Wi-Fi device;
collect, by the plurality of Wi-Fi sniffers, measurement data associated with the at least one Wi-Fi device in response to transmission of the broadcast probe or the directed probe from the at least one Wi-Fi device, including adjusting a listening duration of the plurality of Wi-Fi sniffers based on a number of the Wi-Fi devices and a probing frequency corresponding to one of the Wi-Fi devices of the plurality of W-Fi devices;

tune at least one parameter associated with an indoor model based on radio frequency (RF) measurements from the plurality of Wi-Fi devices; and
estimate a position of the at least one Wi-Fi device using an adaptive machine learning model based on the tuned indoor model and the measurement data.

9. The system according to claim 8, wherein the plurality of Wi-Fi sniffers use a synchronization algorithm to switch to and sniff same channels simultaneously.

10. The system according to claim 8, wherein the processor is configured to:
transmit, by the at least one Wi-Fi device, a probe request message to at least one Wi-Fi access point of the plurality of Wi-Fi access points on receiving a beacon with a NULL SSID value.

11. The system according to claim 8, wherein the processor is configured to:
count the common SSIDs to determine a router SSID corresponding to at least one Wi-Fi access point of the plurality of Wi-Fi access points;
enable the at least one Wi-Fi access point to broadcast the router SSID; and
on detecting the router SSID, transmit, by the at least one Wi-Fi device, a probe request message to the at least one Wi-Fi access point.

12. The system according to claim 8, wherein the measurement data comprise Received Signal Strength Indicator (RSSI) signals associated with the plurality of Wi-Fi devices.

13. The system according to claim 8, wherein the adaptive machine learning model is trained using data obtained through a solution of the indoor model based on the at least one parameter and the measurement data collected by the plurality of Wi-Fi sniffers.

14. The system according to claim 8, wherein the adaptive machine learning model is updated based on checking a pre-training range associated with RSSI measurements from the plurality of Wi-Fi devices and a plurality of parameters associated with the indoor model.

15. A method for tracking a position of at least one Wi-Fi device of a plurality of Wi-Fi devices, the method comprising:
triggering, by a Wi-Fi access point of a plurality of Wi-Fi access points and a Wi-Fi sniffer of a plurality of Wi-Fi sniffers, one of a broadcast probe transmission or a directed probe transmission from the at least one Wi-Fi device, the triggering further including broadcasting, by the at least one Wi-Fi access point, one of hidden service set identifiers (SSIDs) or common SSIDs to increase a probing tendency of the at least one Wi-Fi device, counting, by the one or more processors, the common SSIDs to determine a router SSID corresponding to at least one Wi-Fi access point of the plurality of Wi-Fi access points, enabling, by the one or more processors, the at least one Wi-Fi access point to broadcast the router SSID and on detecting the router SSID, transmitting, by the at least one Wi-Fi device, a probe request message to the at least one Wi-Fi access point;
collecting, by the plurality of Wi-Fi sniffers, measurement data associated with the at least one Wi-Fi device in response to transmission of the broadcast probe or the directed probe from the at least one Wi-Fi device, wherein the plurality of Wi-Fi sniffers use a synchronization algorithm to switch to and sniff same channels simultaneously;

tuning, by one or more processors, at least one parameter corresponding to an indoor model based on radio frequency (RF) measurements from the plurality of Wi-Fi devices; and estimating, by the one or more processors, a position of the at least one Wi-Fi device using an adaptive machine learning model based on the tuned indoor model and the measurement data.

16. The method of claim 15, wherein the triggering further comprises:

on receiving a beacon with a NULL SSID value, transmitting, by the at least one Wi-Fi device, a probe request message to at least one Wi-Fi access point of the plurality of Wi-Fi access points.

17. The method according to claim 15, wherein the collecting comprises, adjusting, by the one or more processors, a listening duration of the plurality of Wi-Fi sniffers based on a number of the Wi-Fi devices and a probing frequency corresponding to one of the Wi-Fi devices of the plurality of W-Fi devices.

18. The method according to claim 15, wherein the measurement data comprise Received Signal Strength Indicator (RSSI) signals associated with the plurality of Wi-Fi devices.

19. The method according to claim 15, further comprising training the adaptive machine learning model using data obtained through a solution of the indoor model based on the at least one parameter and the measurement data collected by the plurality of Wi-Fi sniffers.

20. The method according to claim 15, further comprising updating the adaptive machine learning model based on checking a pre-training range associated with RSSI measurements from the plurality of Wi-Fi devices and a plurality of parameters associated with the indoor model.

* * * * *